United States Patent [19]

Schreiber et al.

[11] Patent Number: 4,994,315
[45] Date of Patent: Feb. 19, 1991

[54] PREFABRICATED PANE OR WINDSHIELD FOR A VEHICLE

[75] Inventors: Herbert Schreiber, Wollerau; Wolfgang Sauer, Buttikon, both of Switzerland

[73] Assignee: Gurit-Essex AG, Switzerland

[21] Appl. No.: 377,233

[22] Filed: Jul. 7, 1989

[30] Foreign Application Priority Data

Jul. 15, 1988 [CH] Switzerland ............. 2720/88

[51] Int. Cl.$^5$ ............................................. B32B 3/00
[52] U.S. Cl. ...................... 428/76; 428/122; 428/192; 49/490; 49/491; 296/84.1; 296/93; 296/95.1
[58] Field of Search ............ 428/76, 122, 192; 49/490, 491; 296/84.1, 93, 95.1

[56] References Cited

U.S. PATENT DOCUMENTS

| | | | |
|---|---|---|---|
| 4,477,507 | 10/1984 | Kunert | 49/491 |
| 4,701,376 | 10/1987 | Hermann et al. | 49/491 |
| 4,795,667 | 1/1989 | Armstrong | 428/210 |

FOREIGN PATENT DOCUMENTS 0128837 12/1984 European Pat. Off. .
3009556 9/1981 Fed. Rep. of Germany .

*Primary Examiner*—Patrick J. Ryan
*Attorney, Agent, or Firm*—Tarolli, Sundheim & Covell

[57] ABSTRACT

The present invention generally relates to the mounting of panes or windshields in a frame, particularly to the mounting of panes or windshields of a vehicle, e.g. an automobile, in the body frame work. The invention provides a pane or windshield ready to be mounted comprising, along its edges, a first profiled bead of adhesive material, already cured and being elastic but not plastically deformable. The first bead comprises an essentially closed hollow chamber and in its interior a second bead of plastically deformable not yet cured adhesive material consisting of a substance chemically compatible to the material of the first bead. The second bead, serving as the real adhesive material, is protected from environmental influences without the need to remove a cover foil or a packing prior to mounting the window.

57 Claims, 4 Drawing Sheets

PREFABRICATED PANE OR WINDSHIELD FOR A VEHICLE

BACKGROUND OF THE INVENTION

1. Field of the Invention

The present invention generally relates to the mounting of windows in a frame, particularly to the mounting of panes or windshields of a vehicle, e.g. an automobile, in the body frame work. The invention provides a pane or windshield ready to be mounted comprising, along its edges, a first profiled bead of adhesive material already cured. This first bead is elastic but not plastically deformable. The first bead is provided with a second bead of plastically deformable not yet cured adhesive material consisting of a substance chemically compatible to the material of the first bead.

2. Prior Art

Conventionally, a vehicle pane or windshield is fixed in the frame of a vehicle body by means of a double U-profile frame member made of rubber or a similarly elastically resilient material. On the one hand, the edge of the pane or windshield is received in a first recess of the double U-profile facing the interior of the double U-profile frame member, and on the other hand, the second recess directed away from the double U-profile frame member engages the edges of a body frame, of a flange or the like of the vehicle body to thereby fix the pane or windshield in its desired position.

More and more, to so-called direct mounting of vehicle panes or windshields is used in which an edge portion of the pane or windshield is glued to the edges of a body frame, of a flange or the like e.g. of a vehicle body by means of a suitable adhesive material. The known methods may be divided into the following three groups:

1. Methods in which the pane or windshield is delivered to the car manufacturer in a "pure" form, in some cases equipped with a layer of material along its edges which is impermeable to light and UV-radiation and/or with a layer of primer material. No further preparation of the pane or windshield glass has been effected. Thereby, the mounting adhesive material is applied immediately in situ, i.e. just before mounting the pane or windshield into the car body by gluing.

2. Methods in which the pane or windshield is provided with a first bead of adhesive material, if appropriate also using a light- or UV-impermeable layer and/or a primer layer. The application of this first bead is performed separatly from the car manufacturing plant or from the assembling line. The first bead is fully cured. The real mounting adhesive material is again applied immediately prior to mounting the pane or windshield into the frame of the car body.

3. Methods in which the pane or windshield is fully prepared, ready to be mounted, distantly from the assembling line and probably some time prior to having to be mounted. Thereby, the adhesive bead required for gluing the pane or windshield into the frame of the car body, consisting of a polyurethane material curing under the influence of moisture, is applied along the edges of the pane or windshield, and the pane or windshield thus prepared, ready to be mounted, is sealed in air tight foil material to enable the pane or windshield to be stored during a certain period without curing of the adhesive material.

All three methods mentioned hereinabove can not provide an optimal solution. The reason is that in all cases considerable time- and labour-consuming operations have to be performed to prepare the pane or windshield for mounting. These operations have to be done immediately in situ, e.g. at the assembly line for an automobile. Particularly, in the case of the methods 1. and 2. explained hereinbefore, the pane or windshield probably has to be cleaned along its edge portion and the adhesive material must be applied to the pane or windshield and/or to the edge portion of the frame, of the flange or the like of a car body. In the case of method 3. explained hereinbefore, a large sized sealing foil must be carefully removed in order not to damage the already applied adhesive material and the large and expensive sealing foil must be removed from the work place and destroyed or recycled in some way.

The purpose of the present invention is, generally speaking and in the widest sense, to improve a method of the category 3. explained hereinbefore and to provide an improved ready-to-mount vehicle pane or windshield.

A method relating to the aforementioned category 1. is known, for instance, from the published German Patent Application P No. 27 30 831 and must not be discussed in detail here. The disadvantages of the methods according to category 1. are well known in the art; particularly disadvantageous is that the edge portion onto which the adhesive material is applied has to be cleaned just prior to applying the adhesive material, the time-consuming applying of the adhesive material bead which must be performed with the utmost accuracy and the short period of time provided to perform these operation which is directly dependent from the operation cycle set for the assembly line.

The method according to the published German Patent Application P No. 34 09 960 relates to the adhesive bonding of vehicle panes or windshields into the frame of a vehicle body whereby the adhesive material is applied directly at the assembly line; thus, this publication belongs to the aforementioned category 2. According to the disclosure of this publication two beads of compatible adhesive material are applied to the pane or windshield in two separate phases. In the first phase, a profiled bead of adhesive material is applied onto an edge region of the pane or windshield and subsequently cured whereby one or more primer layers may be provided between said profiled bead and the surface of the pane or windshield. Thus, in the second phase when the second bead is applied, the first profiled bead forms an intermediate body between the pane or windshield and the second bead, said intermediate body being no longer plastically deformable.

While the profiled first bead applied onto the pane or windshield is already cured when the pane or windshield is to be mounted, the second bead is applied at the assembly line immediately before mounting the pane or windshield.

It is admitted that certain minor advantages result from a method disclosed in the two aforementioned German Patent Applications, especially with respect to the application of the second bead of adhesive material which is the real bonding bead; however, many of the disadvantages discussed in connection with the proceeding according to category 1. hereinbefore are nevertheless existing.

The only publication known to the inventors which belongs to the aforementioned category 3., i.e. a method in which the pane or windshield is prepared ready to be mounted into a car body, is the published German Patent Application P No. 36 38 449. According to the disclosure of this publication, the application of the adhesive material onto the pane or windshield is performed independently with regard to time and place of the car to which the pane or windshield has to be mounted. An adhesive material is used which cures under the influence of atmospheric moisture. The adhesive material is protected from any moisture during its application or immediately thereafter until to the moment of mounting the pane or windshield into the car by a combination of a superposition of a dry protection gas with a chemical drying agent and/or a physical drying process.

The pane or windshield with the applied adhesive material is singly or in groups of several units packaged in an environment free of moisture such that the adhesive material can not contact any moisture during the subsequent storage or transport.

Preferably, the pane or windshield is sealed between air tight foils such that the foil have a certain distance from the adhesive material. Then, the air enclosed in this pane or windshield package is evacuated and the package is filled with a protection gas. The pressure on the pane or windshield and the adhesive material can correspond to the atmospheric environment pressure such that even soft parts of the package are not deformed.

In the place where the pane or windshield is to be mounted, the still packed pane or windshield must be ventilated in order to enable the foil to be removed. In order to support this operation the pane or windshield packaging can comprise means for the ventilating of the packaging at a later date. For instance, suitable ventilating tubes may be provided in the packaging. The ventilating operation can be performed with air having a high humidity to displace the protection gas. If a certain time period has gone before the foil is removed the curing of the adhesive material can be accelerated.

Essential is, consequently, that the pane or windshield is readily prepared by means of cleaning agents, primers and adhesive material separately with regard to time and place from the assembly line, from the repair shop or the like, and that the adhesive material is perfectly sealed against moisture.

It is true that a proceeding in line with the teaching of the aforementioned publication removes the need to apply the real mounting adhesive material bead in situ, e.g. at the assembly line. On the other hand, however, it is disadvantageous that the pane or windshield prepared in accordance with the teaching of the aforementioned publication must firstly be prepared for the ventilating operation, that usually a certain time has to pass after the ventilation operation, that the unpacking of the pane or windshield is cumbersome and time-consuming, and that the voluminous packaging material has to be removed from the work station and destroyed or recycled. Moreover, the aforementioned publication does not disclose how an unintentional and highly unwelcome escaping of the still pasty adhesive material over the edge of the pane or windshield and/or into the viewing area of the pane or windshield is avoided.

OBJECTS OF THE INVENTION

It is a basic object of the invention to provide a vehicle pane or windshield according to category 3. as mentioned hereinbefore having improved characteristics. Particularly, a vehicle pane or windshield shall be provided which is ready to use at an assembly line, in a repair work shop or the like without the need to apply an adhesive material thereto.

It is a further object of the invention to provide a vehicle pane or windshield in a ready-to-use condition which can be mounted into a car body framework without time-consuming preparation operations.

It is a still further object of the invention to provide a vehicle pane or windshield in a ready-to-use condition which must not be ventilated and unpacked in a time-consuming operation prior to be ready to be mounted into the car body framework.

It is a still further object of the invention to provide a vehicle pane or windshield in a ready-to-use condition which is not contained in a bulky package, thereby avoiding the need to unpack the pane or windshield and to remove heavy packaging material from the work place.

SUMMARY OF THE INVENTION

In order to meet these and other objects, the invention provides a prefabricated pane or windshield for a vehicle adapted to be directly mounted into a frame, a flange or the like of the vehicle. The pane or windshield comprises a first profiled bead of adhesive material applied to the inner surface of the pane or windshield along its edges which is elastically but not plastically deformable. Further, there is provided a second bead of adhesive material applied to the first profiled bead of adhesive material consisting of a material which is chemically compatible with the first profiled bead of adhesive material and which is plastically deformable or, if appropriate, activatable.

The first profiled bead of adhesive material comprises a hollow chamber which is essentially closed and the second bead of adhesive material is located in the interior of the hollow chamber. Finally, the pane or windshield comprises means which are moved into the hollow chamber upon insertion of the pane or windshield into the frame, flange or the like and thereby squeeze the second bead of adhesive material contained in the hollow chamber at least partially out of the hollow chamber.

Such a pane or windshield can be delivered e.g. to the assembly line of a vehicle manufacturing plant and the only measure to be taken is, depending of the kind of the adhesive material used to form the second bead of adhesive material, to activate the material of the second bead of adhesive material and to insert the pane or windshield. Thereby, for instance a portion of the first profiled bead of adhesive material or an expulsion member is into the hollow chamber receiving the second bead of adhesive material and this portion or expulsion member squeezes the second bead of adhesive material out of the hollow chamber in the region of the frame, flange or the like in which the pane or windshield has to be mounted. Up to the moment of mounting the pane or windshield, the second bead of adhesive material, i.e. the real mounting adhesive, is protected from environmental influences like atmospheric moisture, light and UV-radiation, contamination etc. Prior to mounting the pane or windshield, it is not necessary to unpack it and to remove and destroy the packing material.

BRIEF DESCRIPTION OF THE DRAWINGS

In the following, some preferred embodiments of the invention will be further described, with reference to the accompanying drawings, in which:

FIG. 1 shows as a first embodiment of the invention a partial sectional view of the edge portion of a vehicle pane or windshield prior to mounting it to a frame, flange or the like;

FIG. 2 shows a similar view as in FIG. 1, but the pane or windshield being mounted into a frame, flange or the like;

FIG. 3 shows as a second embodiment of the invention a partial sectional view of the edge portion of a vehicle pane or windshield prior to mounting it to a frame, flange or the like;

FIG. 4 shows a similar view as in FIG. 3, but the pane or windshield being mounted into a frame, flange or the like;

FIG. 5 shows as a third embodiment of the invention a partial sectional view of the edge portion of a vehicle pane or windshield prior to mounting it to a frame, flange or the like;

FIG. 6 shows a similar view as in FIG. 5, but the pane or windshield being mounted into a frame, flange or the like;

FIG. 7 shows as a fourth embodiment of the invention a partial sectional view of the edge portion of a vehicle pane or windshield prior to mounting it to a frame, flange or the like;

FIG. 8 shows a similar view as in FIG. 7, but the pane or windshield being mounted into a frame, flange or the like;

FIG. 9 shows as a fifth embodiment of the invention a partial sectional view of the edge portion of a vehicle pane or windshield prior to mounting it to a frame, flange or the like;

FIG. 10 shows a similar view as in FIG. 9, but the pane or windshield being mounted into a frame, flange or the like;

FIG. 11 shows as a sixth embodiment of the invention a partial sectional view of the edge portion of a vehicle pane or windshield prior to mounting it to a frame, flange or the like;

FIG. 12 shows a similar view as in FIG. 11, but the pane or windshield being mounted into a frame, flange or the like;

FIG. 13 shows as a seventh embodiment of the invention a partial sectional view of the edge portion of a vehicle pane or windshield prior to mounting it to a frame, flange or the like;

FIG. 14 shows a similar view as in FIG. 13, but the pane or windshield being mounted into a frame, flange or the like;

FIG. 15 shows as a eighth embodiment of the invention a partial sectional view of the edge portion of a vehicle pane or windshield prior to mounting it to a frame, flange or the like;

FIG. 16 shows a similar view as in FIG. 15, but the pane or windshield being mounted into a frame, flange or the like;

FIG. 17 shows as a ninth embodiment of the invention a partial sectional view of the edge portion of a vehicle pane or windshield prior to mounting it to a frame, flange or the like;

FIG. 18 shows a similar view as in FIG. 17, but the pane or windshield being mounted into a frame, flange or the like;

FIG. 19 shows as a tenth embodiment of the invention a partial sectional view of the edge portion of a vehicle pane or windshield prior to mounting it to a frame, flange or the like; and FIG. 20 shows a similar view as in FIG. 19, but the pane or windshield being mounted into a frame, flange or the like.

It should be noted that for the reason of simplicity in all drawings only a simple one layer pane or windshield is shown. It is understood that the invention is not limited to this kind of pane or windshields. Particularly, laminated glass or multilayer glass panes or windshields may be used as usual today in vehicles.

Figure 1:
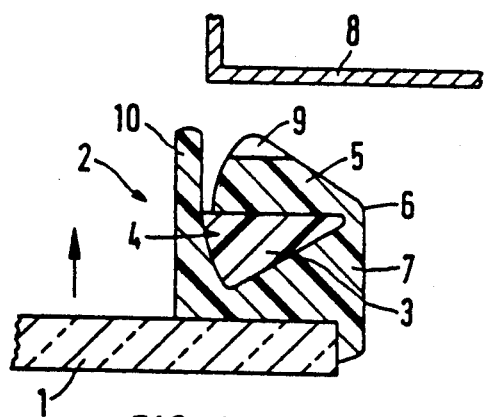

According to FIG. 1, there is shown a lateral portion of a pane or windshield ready to be mounted in a sectional view. The pane or windshield 1 is provided with a first profiled bead of adhesive material running along the edges of the pane or windshield and designated generally by reference numeral 2. The first profiled bead of adhesive material 2 may consist, for instance, of a cured polyurethane adhesive and sealing material which adheres to the pane or windshield 1. If appropriate, the pane or windshield 1 can be provided with a primer layer (not shown) prior to applying the first profiled bead of adhesive material. The first profiled bead of adhesive material 2 is in its cured condition and the material is selected such that it is elastic to a certain degree, but not plastically deformable.

The first profiled bead of adhesive material 2 delimits in the widest sense, in its rest position, e.g. the pane or windshield 1 not yet mounted to a frame or flange, a hollow chamber adapted to receive a second bead of adhesive material 3. this second bead of adhesive material 3 is in any case plastically deformable and/or, depending of the material it consists, activatable, and serves as the real mounting adhesive. It is essential that the materials of the first profiled bead of adhesive material 2 on the one hand and the material of the second bead of adhesive material 3 are chemically compatible.

In the embodiment according to FIG. 1, the the first profiled bead of adhesive material 2 a tub-like recess 4 having essentially V-shaped cross section and receiving the second bead of adhesive material 3. The surface of the tub-like recess 4 and thereby the free surface of the second bead of adhesive material 3 is covered by a portion 5 of the first profiled bead of adhesive material 2 which has, as can be seen from FIG. 1, approximately triangular cross section. The portion 5 is integrally shaped on the upper edge 6 of one of the side walls 7 of the first profiled bead of adhesive material 2 and can be pivoted around the upper edge 6 into the tub-like recess 4 whereby it is elastically deformed.

The elastically movable portion 5 has, as already mentioned, essentially triangular shape in cross section whereby the apex of the triangle protrudes over the aforementioned V-shaped tub-like recess. The base of the triangle opposite to the apex predominantly closes the tub-like recess 4, i.e. the major part of the open tub-like recess 4 is covered by the base of the triangle.

If the pane or windshield 1 provided with the prepared first and second beads of adhesive material 2 and 3 is pressed against the mounting flange 8 of a vehicle, the elastically movable portion 5 is displaced into the tub-like recess 4 and thereby at least partially squeezes the second bead of adhesive material 3 out of the tub-like recess 4. This situation is shown in FIG. 2.

In order to facilitate the escaping of the second bead of adhesive material 3 out of the tub-like recess 4, the elastically movable portion 5 of the first profiled bead of adhesive material 2 is provided with a plurality of recesses 9 located in the region of the outer edge of the triangle. The recesses 9 can be in the form of slots extending parallel to the base of the triangular portion 5 covering the second bead of adhesive material 3.

Preferably, the wall 10 of the first profiled bead of adhesive material 2 delimiting said tub-like recess 4 which is opposite to the wall 7 provided with the elastically movable portion 5 is higher than said wall 7. The purpose thereof is that the second bead of adhesive material 3 cannot escape into the viewing area of the pane or windshield 2 when it is squeezed out of the tub-like recess 4. The height of the side wall 10 can correspond essentially to the height of the elastically movable portion 5 of the first profiled bead of adhesive material 2.

Figure 2:
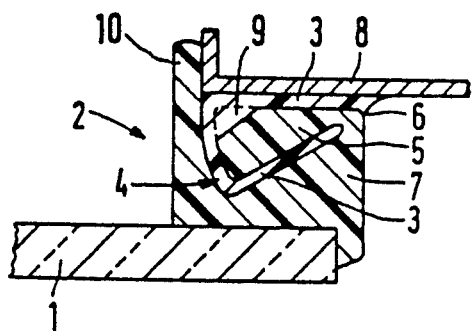
Figure 3:
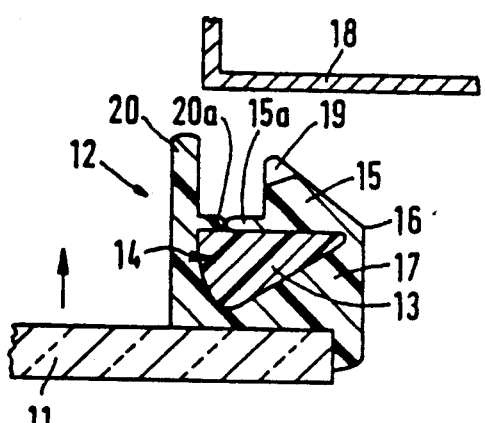
Figure 4:
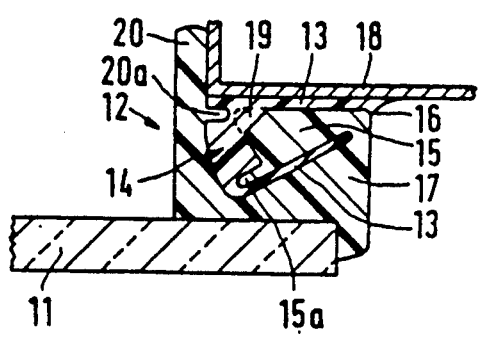

A second embodiment of the invention is shown in FIGS. 3 and 4 having similar design as the embodiment shown in FIGS. 1 and 2. Again, the pane or windshield 11 is provided with a first profiled bead of adhesive material 12 which receives in its tub-like recess 14 a second plastically deformable bead of adhesive material 13. In an effort to cover the second bead of adhesive material 13 as completely as possible when the pane or windshield 11 is not yet mounted, the elastically movable portion 15 is provided with a rib 15a projecting against the opposite side wall 20 of the first profiled bead of adhesive material 12. The rib 15a cooperates with a further rib 20a provided at the aforementioned side wall 20, i.e. at the side wall opposite to the side wall 17 having the elastically movable portion 15. As the material of the first profiled bead 12 is elastically deformable, a nearly perfect sealing of the tub-like recess 14 receiving the second bead of adhesive material 13 can be achieved by suitable dimensioning the ribs 15a and 20a.

In a similar manner as described in connection with the first embodiment shown in FIGS. 1 and 2, the elastically movable portion 15 of the first profiled bead of adhesive material 12 is pivoted around the upper edge 16 of the wall 17 and pressed into the interior of the tub-like recess 14 upon inserting the pane or windshield 11 into the flange 18. Thereby, the second plastically deformable bead of adhesive material escapes out of the tub-like recess 14 and ensures as the real mounting adhesive the connection of the pane or windshield 11 to the flange 18.

In order to facilitate the escaping of the second bead of adhesive material 13 out of the tub-like recess 14, the pivotable portion 15 of the first profiled bead of adhesive material 12 can be provided with slot-like recesses 19 again as it has been described in connection with FIGS. 1 and 2.

Finally, in analogy to the first embodiment again, the wall 20 opposite to the wall 17 provided with the elastically movable portion 15 can be higher than said wall 17.

Figure 5:
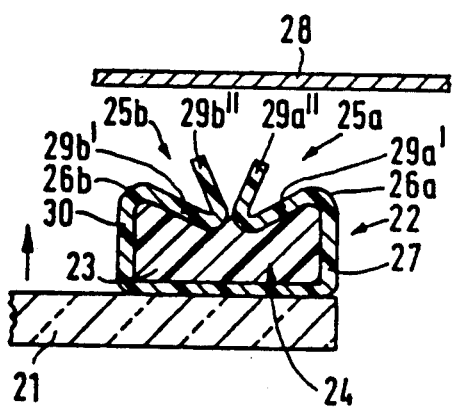
Figure 6:
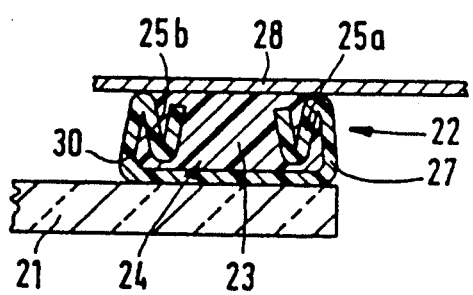

A further embodiment of the invention is shown in FIGS. 5 and 6. Similarly as hereinbefore described in connection with the embodiments of FIGS. 1, 2 and FIGS. 3, 4, respectively, the pane or windshield 21 is provided with a first profiled bead of adhesive material 22 delimiting a tub-like recess 24 having essentially U-shaped cross section. The tub-like recess 24 is filled with a plastically deformable second bead of adhesive material 23. The upper edges 26a and 26b of the first profiled bead of adhesive material 22 are provided with elastically movable vable portions 25a and 25b which essentially fully cover the tub-like recess 24 containing the plastically deformable second bead of adhesive material 23 serving as the real mounting adhesive.

The tub-like recess 24 is delimited by two slide walls 27 and 30 which are part of the first profiled bead of adhesive material 22. The portions 25a and 25b elastically movably mounted on the upper edges 26a and 26b of the side walls 27 and 30 consist of first sections 29a' and 29b' which essentially fully cover the tub-like recess 24, as well as of sections 29a'' and 29b'' fixed to the free edges of the sections 29a' and 29b' and projecting over the upper surface of the tub-like recess 24.

As can be seen in FIG. 6, upon insertion of the pane or windshield 21 into the flange 28, the two elastically movable portions 25a and 25b are bent away and pressed into the interior of the tub-like recess 24 due to the fact that the two projecting sections 29a'' and 29b'' abut against the surface of the flange 28 with the result that the plastically deformable second bead of adhesive material 23 at least partially escapes from the tub-like recess 24 and assists in establishing an intimate connection between pane or windshield 21 and flange 28.

Figure 7:
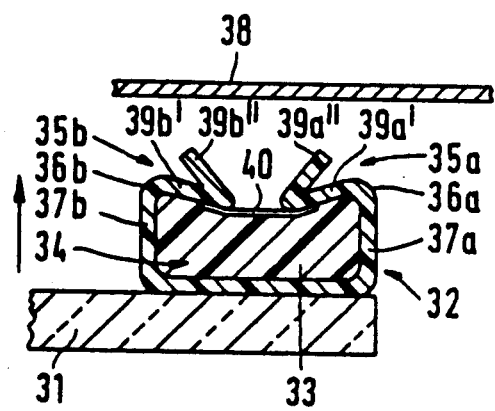
Figure 8:
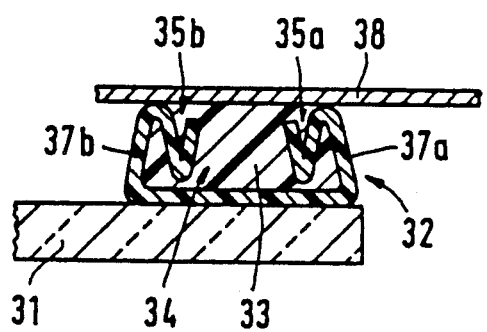

The fourth embodiment of the invention shown in FIGS. 7 and 8 is very similar to the third embodiment shown in FIGS. 5 and 6 and explained just hereinabove. Again, the pane or windshield 31 is provided with a first profiled bead of adhesive material 32 delimiting a tub-like recess 34 in which a plastically deformable second bead of adhesive material 33 serving as the real mounting adhesive is received. Elastically movable portions 35a and 35b are mounted on the upper edges 36a and 36b of the two side walls 37a and 37b. They include also elastically movable first sections 39a' and 39b' as well as second sections 39a'' and 39b'' fixed to the free edges of the first sections 39a' and 39b' and projecting over the top surface of the tub-like recess 34. Upon insertion of the pane or windshield 31 into the flange 38, the second sections 39a'' and 39b'' abut against the surface of the flange 38 and effect that the portions 36a and 36b are elastically deformed and pressed into the interior of the tub-like recess 34.

In order to ensure an optimal sealing of the tub-like recess 34 containing the plastically deformable second bead of adhesive material 33, the two elastically movable first sections 39a' and 39b' extending at least partially over the top surface of the tub-like recess 34 are interconnected by means of a foil 40. Thereby, it is ensured that the plastically deformable second bead of adhesive material 33 is hermetically sealed and, thus, protected from environmental influences like atmospheric moisture, UV-radiation, contamination and the like.

The foil 40 preferable consists of a material which is chemically compatible with the first profiled bead of adhesive material 32 and with the plastically deformable second bead of adhesive material 33. In order to avoid that the foil 40 has to be removed prior to insertion of the pane or windshield 31 into the flange 38, the foil 40 preferable either is made very thin such that the foil 40 is teared when the elastically movable portions 35a and 35b are pressed into the interior of the tub-like recess 34, or the foil 40 just slightly adheres to the sections 39a' and 39b' that the connection is released upon pressing the portions 35a and 35b into the interior of the tub-like recess 34.

As can be seen from FIG. 8, the plastically deformable second bead of adhesive material 33 is squeezed out of the tub-like recess 34 at least partially upon insertion of the pane or windshield 31 into the flange 38 in order to establish an intimate connection between pane or windshield 31 and flange 38.

Figure 9:
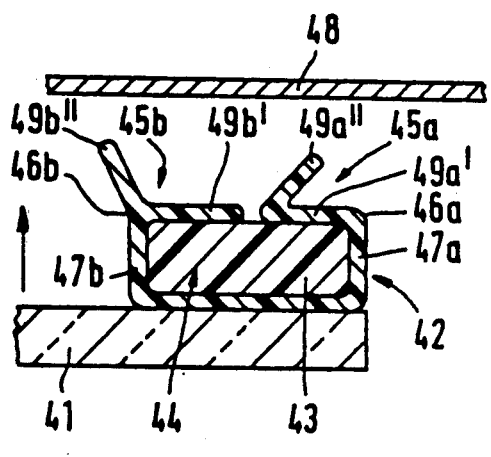
Figure 10:
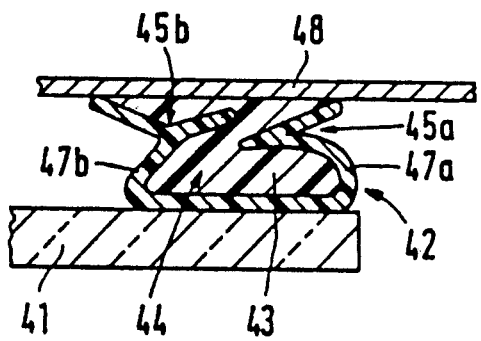

A fifth embodiment of the invention is shown in FIGS. 9 and 10. Again, the pane or windshield 41 is provided with a first profiled bead of adhesive material 42 delimiting a tub-like recess 44 in which a plastically deformable second bead of adhesive material 43 serving as the real mounting adhesive is received. Similarly, elastically movable portions 45a and 45b are provided at the upper edges of the two side walls 47a and 47b of the first profiled bead of adhesive material 42 which project over the top surface of the tub-like recess 44 and which are elastically movable into the interior of the tub-like recess 44 upon insertion of the pane or windshield 41 into the flange 48.

In the embodiment shown in FIGS. 9 and 10, the first profiled bead of adhesive material 42 is asymmetrically shaped: One of the side walls 47a is provided, similar as in the embodiments according to FIGS. 5-8, with a first section 49a' which is elastically movable around the upper edge of the side wall 47a. A second section 49a" is connected to the free end of the first section 49a' and projects over the top surface of the tub-like recess 44. The other side wall 47b is provided, on the one hand, with a first section 49b' elastically movably mounted on the upper edge of the side wall 47b, and, on the other hand, with a second section 49b" also connected to the upper edge 46b of the side wall 47b and also projecting over the top surface of the tub-like recess 44.

As can be seen in FIG. 10, a relatively broad-spread escaping of the plastically deformable second bead of adhesive material 43 out of the tub-like recess 44 is achieved by the asymmetrical design of the first profiled bead of adhesive material 42 when the pane or windshield 41 is inserted into the flange 48. Also in this embodiment, as can be seen in FIG. 9, the plastically deformable second bead of adhesive material 43, i.e. the real mounting adhesive, is predominantly covered by the elastically movable portions 49a' and 49b' and therefore protected from environmental influences.

Figure 11:
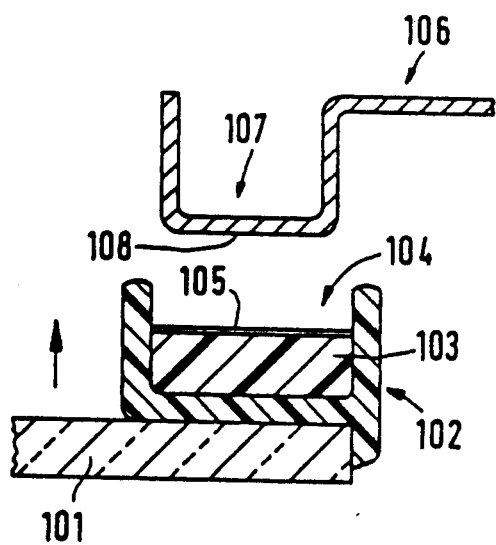
Figure 12:
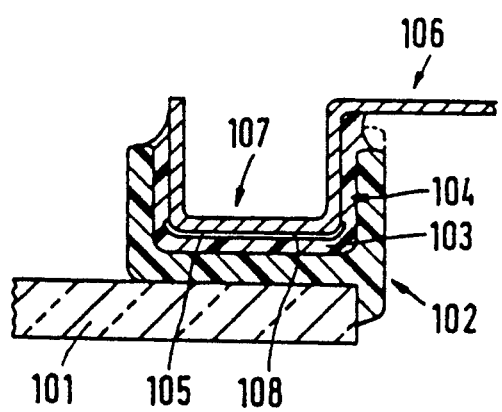

A further embodiment of the invention is shown in FIGS. 11 and 12. The pane or windshield 101 according to FIG. 11 is provided with a first profiled bead of adhesive material generally designated with reference numeral 102 and extending along the edge of the pane or windshield 101. The first profiled bead of adhesive material 102 consists e.g. of a cured polyurethane adhesive and sealing substance which adheres to the pane or windshield 101 whereby, if appropriate, a not shown primer layer may be applied to the edge portion of the pane or windshield 101 prior to applying the first profiled bead of adhesive material 102. The first profiled bead of adhesive material 102 is in fully cured condition and the material is selected such that it shows elastic behaviour to a certain extent, but is not plastically deformable.

The first profiled bead of adhesive material 102 delimits a hollow chamber 104 which is open at its top side and which receives a plastically deformable second bead of adhesive material 103. This plastically deformable second bead of adhesive material 103 is still plastically deformable and/or activatable, depending on the material selected therefor in order to serve as the real mounting adhesive. Essential is that the substances of the first profiled bead of adhesive material 102 and of the plastically deformable second bead of adhesive material 103 are chemically compatible.

In the embodiment shown in FIG. 11, the first profiled bead of adhesive material 102 delimits a hollow chamber in the shape of an elongated tub-like recess 104 in which the plastically deformable second bead of adhesive material 103 is located. The freely exposed surface of the plastically deformable second bead of adhesive material 103 is covered by a foil 105. Preferably, the elongated tub-like recess 104 delimited by the first profiled bead of adhesive material 102 is only partially filled with the plastically deformable second bead of adhesive material 103.

The thus prepared pane or windshield 101 has to be mounted into a flange, a frame or the like. In the present example, the frame is designated with reference numeral 106 and comprises a U-shaped protruding portion 107, the width thereof being somewhat less than the inner width of the elongated tub-like recess 104 delimited by the first profiled bead of adhesive material 102. Upon insertion of the pane or windshield 101 into the frame 106, initially, the projecting surface 108 of the protruding portion 107 of the frame 106 abuts against the surface of the foil 105 covering the plastically deformable second bead of adhesive material 103. When the pane or windshield 101 is pressed into the frame 106, the protruding portion 107 of the frame 106 deforms the foil 105 and nestles against the protruding portion 107 due to the plastic consistency of the plastically deformable second bead of adhesive material 103.

Upon penetrating the elongated tub-like recess 104, the protruding portion 107 squeezes the plastically deformable second bead of adhesive material 103 at least partially out of the elongated tub-like recess 104 and the adhesive material 103 surrounds the entire protruding portion 107, as can be seen in FIG. 12.

Preferably, the foil 105 is manufactured of a plastic material which is chemically compatible with the substance of the first profiled bead of adhesive material 102 and with the substance of the plastically deformable second bead of adhesive material 103.

If the foil 105 rests on the plastically deformable second bead of adhesive material 103 with its entire surface, the plastically deformable second bead of adhesive material 103 is reliably protected from environmental influences like atmospheric moisture, UV-radiation, contamination or the like. A removal of the foil 105 is not necessary prior to insertion of the pane or windshield 101 into the frame 106 as the width of the protruding portion 107 of the frame 106 is somewhat less than the inner width of the elongated tub-like recess 104; thus, enough space is available in the region of the lateral walls of the protruding portion 107 to enable the plastically deformable second bead of adhesive material 103 expulsed from the elongated tub-like recess 104 to fully surround the protruding portion 107 and to thereby ensure an intimate connection between the frame 106 and the pane or windshield 101.

Figure 13:
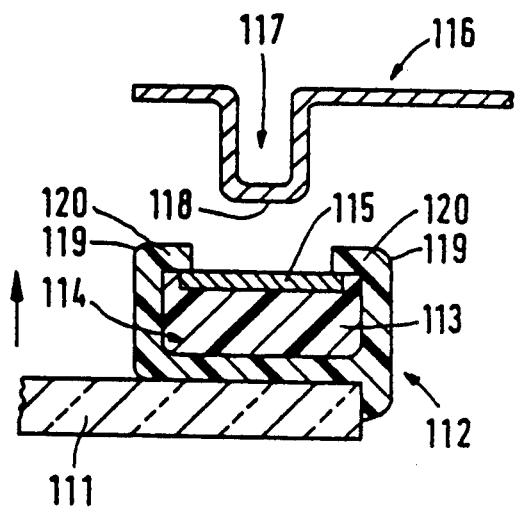
Figure 14:
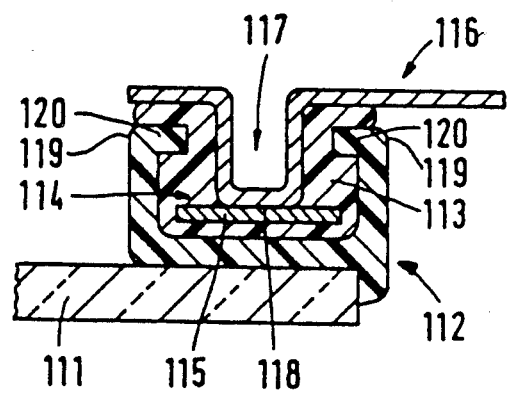

A further embodiment of the invention is shown in FIGS. 13 and 14. It is similar to the embodiment shown in FIG. 11 and 12. However, the cover member for the plastically deformable second bead of adhesive material 113 is constituted by a rigid, sheet-like member 115. The first profiled bead of adhesive material 112 again delimits an elongated tub-like recess 114 having U-shaped cross section. The upper edges 119 of the side walls of the elongated tub-like recess 114 are provided each with a rib 120 projecting towards each other. The rigid sheet-like member 115 serving as the cover member for the plastically deformable second bead of adhesive material 113 has a width which is somewhat less than the inner width of the elongated tub-like recess 114 delimited by the first profiled bead of adhesive material 112.

Thereby, gaps are left on both sides of the cover member 115 enabling the expulsion of the plastically deformable second bead of adhesive material 113 out of the elongated tub-like recess 114 when the pane or windshield 111 is inserted into the frame 116.

Similarly as described in connection with FIGS. 11 and 12, the frame 116 is provided with a protruding portion 117, the frontal surface 118 thereof abutting against the surface of the cover member 115 when the pane or windshield 111 is inserted into the frame 116. The width of the protruding portion 117 is substantially less than the inner width of the elongated tub-like recess 114. When the pane or windshield 111 is pressed into the frame 116, the cover member 115 is displaced towards the bottom of the elongated tub-like recess 114 whereby a certain amount of the plastically deformable second bead of adhesive material 113 serving as the real mounting adhesive is expulsed out of the elongated tub-like recess 114. This situation is shown in FIG. 14.

In the initial status of the pane or windshield 111, as shown in FIG. 13, the plastically deformable second bead of adhesive material 113 is fully covered by the cooperation of the cover member 115 with the projecting ribs 120. Also in this case, removing the cover member 115 is not necessary since enough space is available along the lateral edges of the cover member 115 and in the region of the lateral walls of the protruding portion 117 of the frame 116 to enable the plastically deformable second bead of adhesive material 113 to flow into this spaces and to thereby establish an intimate connection between pane or windshield 111 and frame 116.

In both cases, i.e. in the embodiment according to FIGS. 11 and 12 as well as in the embodiment according to FIGS. 13 and 14, the height of the protruding portion 107 and 117, respectively, is at least equal or more than the thickness of the plastically deformable second bead of adhesive material 103 and 113, respectively, received in the elongated tub-like recess 104 and 114, respectively, in order to ensure a sufficient expulsion of the plastically deformable second bead of adhesive material 103 and 113, respectively, out of the elongated tub-like recess 104 and 114, respectively. In the embodiment according to FIGS. 14 and 14, the width of the protruding portion 117 is preferably substantially less than the inner width of the elongated tub-like recess 114 in order to facilitate the expulsion of the real mounting adhesive in the form of the plastically deformable second bead of adhesive material 113 out of the elongated tub-like recess 114.

Figure 15:
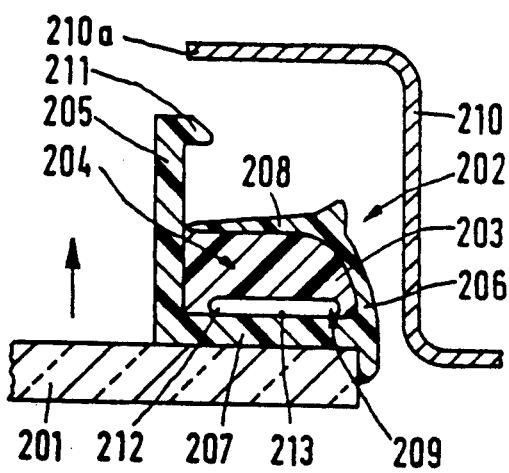
Figure 16:
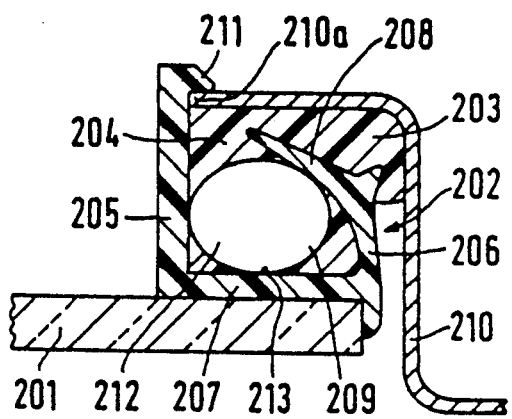

A further embodiment of the invention is shown in FIGS. 15 and 16. The pane or windshield 201 according to FIG. 15 is provided with a first profiled bead of adhesive material generally designated with reference numeral 202 and extending along the edge of the pane or windshield 201. The first profiled bead of adhesive material 202 consists e.g. of a cured polyurethane adhesive and sealing substance which adheres to the pane or windshield 201 whereby, if appropriate, a not shown primer layer may be applied to the edge portion of the pane or windshield 201 prior to applying the first profiled bead of adhesive material 202. The first profiled bead of adhesive material 202 is in fully cured condition and the material is selected such that it shows elastic behaviour to a certain extent, but is not plastically deformable.

The first profiled bead of adhesive material 202 delimits in its rest position, i.e. when the pane or windshield 201 is not yet mounted, a hollow chamber 204 which receives a plastically deformable second bead of adhesive material 203. This plastically deformable second bead of adhesive material 203 is still plastically deformable and/or activatable, depending on the material selected therefor in order to serve as the real mounting adhesive. Essential is that the substances of the first profiled bead of adhesive material 202 and of the plastically deformable second bead of adhesive material 203 are chemically compatible.

According to the embodiment shown in FIG. 15, the first profiled bead of adhesive material 212 delimits a hollow chamber 204 having essentially rectangular cross section and in which the plastically deformable second bead of adhesive material 203 is received. In its rest position, i.e. when the pane or windshield 201 is not yet mounted to the frame 210, the hollow chamber, the hollow chamber 204 is essentially closed. For this purpose, the first profiled bead of adhesive material 202 comprises a first lateral wall 205, a second lateral wall 206 and a base portion 207; These parts 205, 206 and 207 delimit an elongated tub-like recess having U-shaped cross section. The hollow chamber 204 is covered by a cover leg 208. Preferably, the cover leg 208 is integrally formed on the upper free edge of the second lateral wall 206 of the hollow chamber 204 and elastically deformable. In this manner, the plastically deformable second bead of adhesive material 203, located in the interior of the hollow chamber 204 reliably protected from environmental influences, e.g. from atmospheric moisture, UV-radiation, contamination and the like.

The first profiled bead of adhesive material 202 is provided with an expulsion member which is designated generally with reference numeral 209 in FIGS. 15 and 16. The expulsion member 209 is adapted to squeeze out the plastically deformable second bead of adhesive material 203 contained in the hollow chamber 204 out at least partially.

In the embodiment shown in FIGS. 15 and 16, one lateral wall 205 is higher than the opposite lateral wall 206 comprising the cover leg 208. Furthermore, the higher lateral wall 205 is equipped with a rib 211 extending along its upper free edge and projecting towards the second lateral wall 206. As can be clearly seen in FIG. 16, this measure allows a locally exactly defined positioning of the pane or windshield 201 with reference to the frame 210.

In the embodiment shown in FIGS. 15 and 16, the expulsion member generally designated with reference numeral 209 is constituted by a flexible tube 212 which is flat in the rest position, i.e. when the pane or windshield 201 is not yet mounted, and located in the interior of the hollow chamber 204, preferably at the bottom thereof and resting on the base portion 207. It is however essential that the flat flexible tube 212 is located below and remote from the cover leg 208.

The flexible tube 212 can be equipped with a tear-off wire or string 213 inserted therein to allow a cutting of the cured adhesive material 202 and 203 and thereby facilitating the removal of a mounted pane or windshield 201.

In FIG. 15, the pane or windshield 201 is shown in its initial status, prior to be mounted. The flange or frame 210 into which the pane or windshield 201 is to be mounted is located in a certain distance from the first profiled bead of adhesive material 202. In order to mount the pane or windshield 201 into the flange or frame 210, there are two possibilities:

1. Prior to mounting the pane or windshield 201, the flexible tube 212 is filled with pressurized air such that it expands and thereby expulses a considerable portion of the plastically deformable second bead of adhesive material 203 located in the hollow chamber 204 and simultaneously elastically deforming the cover leg 208. Thus, out of the hollow chamber 204, a sufficient amount of plastically deformable second bead of adhesive material 203 serving as the real mounting adhesive is available such that the pane or windshield 201 can be inserted into the flange, frame 210 or the like until the rib 211 overlaps the edge 210a of the flange or frame 210.

2. Another possibility is to insert the pane or windshield 201 into the frame or flange 210 in the status as shown in FIG. 15, i.e. without the expulsion member 209 having been activated until the edge 210a of the frame or flange 210 engages the rib 211. Thereafter, the expulsion member 209 in the form of the flat flexible tube 212 is expanded by blowing in pressurized air such that the plastically deformable second bead of adhesive material 203 at least partially escapes from the hollow chamber 204 and fills the space between the now elastically deformed cover leg 208 and the adjacent portion of the frame or flange 210.

In both cases, the situation shown in FIG. 16 will be reached in which the pane or windshield 201 is mounted in the frame or flange 210 via the already cured first profiled bead of adhesive material and the plastically deformable second bead of adhesive material 203 serving as the real mounting adhesive.

Figure 17:
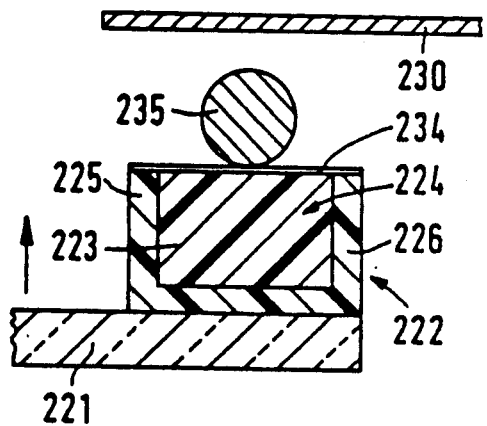
Figure 18:
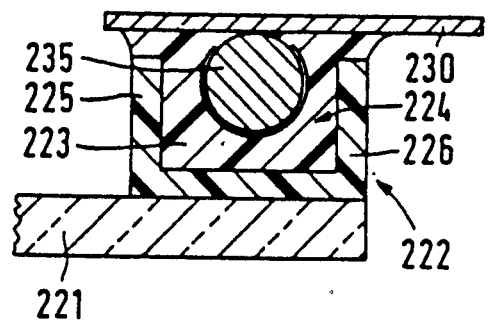

A further embodiment of the invention is shown in FIGS. 17 and 18. In this case, the first profiled bead of adhesive material 222 applied to the pane or windshield 221 an essentially U-shaped elongated tub-like recess delimiting a hollow chamber 224 which is open at its top side. The two lateral walls 225 and 226 of the first profiled bead of adhesive material 222 are interconnected by a foil 234 fixed to the upper edges of the two lateral walls 225 and 226 such that the hollow chamber 224 is sealed. The plastically deformable second bead of adhesive material 223 serving as the real mounting adhesive is contained in the interior of the hollow chamber 224.

The foil 234 is further provided with an expulsion member 235 mounted on the outer surface thereof and projecting over the top surface of the first profiled bead of adhesive material 222. Preferably, the expulsion member has circular cross section whereby its diameter is less than the inner width of the hollow chamber 224 filled with the plastically deformable second bead of adhesive material 223.

When the pane or windshield 221 is mounted in a frame or flange 230, firstly the expulsion member 235 abuts against the surface of the frame or flange 230. As soon as the pane or windshield 221 is pressed further towards the frame or flange 230, the expulsion member 235 is pressed into the interior of the hollow chamber 224, thereby removes the foil 234 from the upper edges of the lateral walls 225 and 226 such that the foil 234 wraps around the expulsion member 235 and squeezes out a part of the plastically deformable second bead of adhesive material 223 contained in the hollow chamber 224 and serving as the real mounting adhesive. This situation is shown in FIG. 18. It is quite evident that it is not necessary to remove the cover foil 234 prior to mounting the pane or windshield 221 in the frame or flange 230. Preferably, the foil 234 consists of a material which is chemically compatible with the plastically deformable second bead of adhesive material 223.

Figure 19:
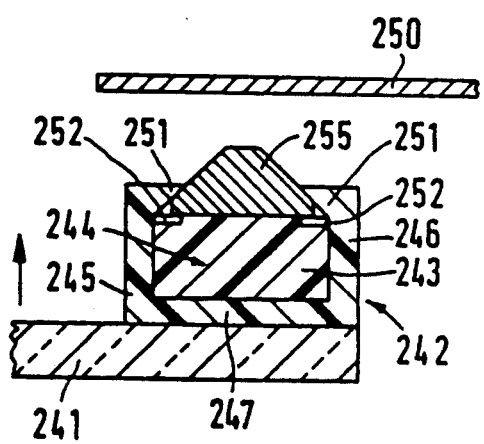
Figure 20:
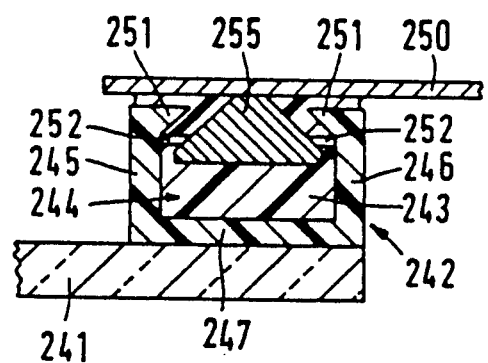

A further embodiment of the invention is shown in FIGS. 19 and 20. As in the previously described embodiments, the pane or windshield 241 is provided with a cured first profiled bead of adhesive material 242 which has similar shape to the one shown in FIGS. 17 and 18, i.e. essentially U-shaped cross section. It comprises two lateral walls 245 and 246 which delimit, together with a base portion 247, a hollow chamber 244 in the shape of an elongated tub-like recess. The upper edges of the two lateral walls 245 and 246 are provided each with a rib 251 projecting towards each other.

The open elongated tub-like recess 244 is filled with a plastically deformable second bead of adhesive material 243 serving as the real mounting adhesive and closed by means of a expulsion member 255.

The expulsion member has essentially triangular cross section and project in height over the two lateral walls 245 and 246. In order to enable the plastically deformable second bead of adhesive material 243 to escape from the elongated tub-like recess 244 when the expulsion member 255 is pressed into the elongated tub-like recess 244, the expulsion member cover only a central part of the width of the free surface of the plastically deformable second bead of adhesive material 243. However, the elongated tub-like recess 244 is nevertheless fully sealed due to the provision of the two projecting ribs 251 which overlap the lateral edges of the expulsion member 255 when it is in its rest position according to FIG. 19. Consequently, the plastically deformable second bead of adhesive material 243 is protected from environmental influences like atmospheric moisture, UV-radiation, contamination and the like.

If appropriate, the two lateral walls 245 and 246 can be provided with two additional supporting ribs 252 located below the aforementioned ribs 251 and projecting towards the interior of the elongated tub-like recess 244. The expulsion member 255 rests on these two supporting ribs 252 and they assist in sealingly closing the elongated tub-like recess 244 in which the plastically deformable second bead of adhesive material 243 is contained. Preferably, the ribs 252 are integrally formed on the inner surfaces of the two side walls 245 and 246 and show an elastic behaviour.

When the pane or windshield 241 is inserted into the frame or flange 250, firstly the surface of the frame or flange 250 abuts against the top surface of the expulsion member 255. When the insertion pressure is increased, the expulsion member 255 is pressed into the elongated tub-like recess 244 and thereby squeezes out at least a part of the plastically deformable second bead of adhesive material 243 contained in the elongated tub-like recess 244. As shown in FIG. 20, the plastically deformable second bead of adhesive material 243 partially escapes from the elongated tub-like recess 244 and ensures, together with the first profiled bead of adhesive material 242, an intimate connection between frame or flange 250 and pane or windshield 241. The supporting ribs 252 are elastically deformed and slide along the sides of the expulsion member 255 when the latter one is pressed into the elongated tub-like recess 244; additionally, the do not have any further function.

Also in this case, it is ensured that the plastically deformable second bead of adhesive material 243 serving as the real mounting adhesive is protected from environmental influences until the pane or windshield 241 is mounted, and that no cover means whatsoever have to be removed prior to mounting the pane or windshield 241.

The manufacturing of the pane or windshield of the invention can be effected as follows:

Initially, a pane or windshield 1, 11, 21, 31, 41, 101, 111, 201, 221 or 241 is cleaned and, if appropriate, provided with an UV-impermeable layer along its edges. Then, a primer layer is applied and dried. In a next step, the first profiled bead of adhesive material 2, 12, 22, 32, 42, 102, 112, 202, 222 or 242 is extruded onto the pane or windshield along its edges. The extrusion can be done according to a method known in the art and details have not to be discussed here. The curing of the first profiled bead of adhesive material can be assisted by treating it with heat and/or steam, depending on the material used for the first profiled bead of adhesive material.

After the curing of the first profiled bead of adhesive material, it is cooled and/or dried, if necessary, in order to create optimal conditions for the subsequent applying of the plastically deformable second bead of adhesive material 3, 13, 23, 33, 43, 103, 113, 203, 223 or 243. It consists, as will be further explained hereinafter, of a substance which is chemically compatible with the material of the first profiled bead of adhesive material and which is not yet reacted or, if appropriate, activatable at a later instant. Sometimes, the application of the plastically deformable second bead of adhesive material, particularly in the case of embodiments according to FIGS. 7, 8, FIGS. 17, 18 and FIGS. 19, 20, must be effected in an inert protection gas atmosphere in order to prevent the plastically deformable second bead of adhesive material from premature curing.

All these manufacturing steps as hereinbefore explained are performed separately with regard to time and place from the real mounting of the pane or windshield. With other words, the pane or windshield can be pre-manufactured as a ready-to-mount unit in a manufacturing plant providing optimal conditions for cleaning the pane or windshield, for applying the primer layer and the first bead, for curing the latter one and for applying the second bead. Thus, the prefabricated vehicle pane or windshield can be delivered to e.g. an automotive manufacturing plant and immediately mounted into a vehicle without any additional step being necessary. The use of a real mounting adhesive material, particularly the time- and labour-consuming applying thereof onto the pane or windshield is avoided.

The first bead of adhesive material 2, 12, 22, 32, 42, 102, 112, 202, 222 or 242 can consist of a polyurethane system material, for instance a moisture curing one component system or a chemically curing two component system. In the first case, the material once applied to the pane or windshield, can be treated by hot steam to accelerate the curing thereof. Anyhow, these polyurethane materials cure quickly and remain elastic even in the fully cured state.

Several different materials can be used to realize the second bead of adhesive material 3, 13, 23, 43, 103, 113, 203, 223 or 243:

a. Adhesive materials curing under the influence of oxygen

These substances have to be sealed against air and oxygen containing gases during their storage. Thus, it is essential to provide a protection foil 39 according to FIG. 7 or a cover member 105, 115, 234 or 255. As an example for adhesive materials curing under the influence of oxygen can be mentioned: A mixture consisting of polyurethane prepolymer having mercaptan and groups and an oxydation accelerator, e.g. according to European Patent No. 0 066 167.

b. Adhesive materials curing under the influence of moisture

In this case, accordingly, the same remarks are true as listed under paragraph a. hereinbefore. As typical examples, the follows substances can be mentioned:

Polymercapto compounds and alkaline earth peroxide in a water-free condition, e.g. according to U.S. Pat. Nos. 3,912,696 or 3,225,017.

Polyurethane prepolymer having silane end groups, e.g. according to U.S. Pat. No. 3,632,557 or U.S. Pat. No. 4,222,925.

Polyurethane prepolymer having isocyanate end groups, e.g. according to U.S. Pat. No. 3,779,794 or European Patent No. 0 040 469.

Silicon compounds curing under the influence of moisture, e.g. according to German Patent No. 12 55 924 or British Patent No. 992 366.

A mixture of a flexible epoxy resin with a polyfunctional cetamine.

A mixture consisting of a flexible epoxy resin with a molecular sieve loaded with polyfunctional amine.

c. Thermoplastic adhesive substances

These adhesive substances are usually called "hot melts", are rigid at room temperature and get pasty or liquid upon heating them to a certain temperature. As soon as they are cooled down they will be rigid again. Due to the fact that the first bead is a bad heat conductor, the conditions to use adhesive substances of this kind is favoured or even possible. The activated, i.e. heated second bead is thermally insulated from the pane or windshield and therefore remains applicable during a sufficient time period. A covering by means of a protection foil 39 and by a cover member 115 or 208, respectively, is not imperative except for the purpose of protecting the second bead from contamination and/or mechanical damage. Examples for such substances are thermoplastic polyurethane caoutchouc.

d. Adhesive substances curing under the influence of heat

Generally, the same remarks are true in this case as listed under c. However, there is one important difference: As soon as these substances are heated over a critical temperature and subsequently cooled down they remain irreversibly in a solid condition. In practice, such a substance to form the second bead is heated to a first temperature $T_1$ which is below the critical temperature $T_2$ in order to enable the second bead to be applied into the tub-like recess or hollow chamber of the first bead. Upon mounting the pane or windshield the second bead is heated again but to a temperature which is higher than said critical temperature $T_2$ and cooled down. The result is that any further heating will not have any influence on the condition of the material of the second bead. As examples for such substances the following ones can be named: Mixtures consisting of an epoxy resin and $BF_3$-amine complex; polyurethane adhesive substances curable under the influence of heat.

e. Slowly reacting two component systems

Such systems can be adjusted to a desired potlife by varying the chemical composition. These systems can be used as second bead in all cases when an extended storage of the pane or windshield is not expected. A protection by means of a foil or a cover member is not required, except to protect the second bead from mechanical damage and contamination. As typical example for such substances can be named: Mixtures consisting of polyurethane prepolymers containing OH-groups and polyurethane prepolymers containing NCO-groups.

In any case, it is important to consider that the material chosen for the second bead of adhesive material 3, 13, 23, 33, 43, 103, 113, 203, 223 or 243 is chemically compatible with the material of the first, already applied and cured bead 2, 12, 22, 32, 42, 102, 112, 202, 222 or 242. With other words, it must be ensured that the second bead, after having been activated, reliably adheres not only to the frame, flange or the like to which the pane or windshield is to be connected but also to the first bead.

The following table shows, for the purpose of illustration only, the most important attributes of some substances which can be used for the second bead. It is understood that the values in said table are only rough guiding figures.

| SUBSTANCE | STORAGE LIFE | ACTIVATION | POTLIFE |
| --- | --- | --- | --- |
| a. | 2–6 months | $O_2$-contact | 10–30 min |
| b. | 30 min to 2 weeks | atmospheric humidity | 10–30 min |
| c. | 6–12 months | heat | 5 s–1 min |
| d. | 6–12 months | heat | 20 s–3 min |
| e. | 30–180 min | — | 30–240 min |

What we claim is:

1. A prefabricated pane or windshield for a vehicle adapted to be directly mounted into a frame, a flange or the like of the vehicle, the pane or windshield comprising:
   a first profiled bead of adhesive material applied to the inner surface of the pane or windshield along its edges which is elastically but not plastically deformable;
   a second bead of adhesive material applied to said first profiled bead of adhesive material, said second bead of adhesive material consisting of a material which is chemically compatible with said first profiled bead of adhesive material and being plastically deformable or, if appropriate, activatable;
   said first profiled bead of adhesive material comprising a hollow chamber which is essentially closed and said second bead of adhesive material being located in the interior of said hollow chamber; and
   means movable into said hollow chamber upon insertion of the pane or windshield into said frame, flange or the like for squeezing said second bead of adhesive material contained in said hollow chamber at least partially out of said hollow chamber.

2. A prefabricated pane or windshield according to claim 1 in which said first profiled bead of adhesive material delimits a hollow chamber which is essentially closed, and in which said means for squeezing out said second bead of adhesive material are constituted by a portion of said first profiled bead of adhesive material which can be displaced into said hollow chamber.

3. A prefabricated pane or windshield according to claim 2 in which said first profiled bead of adhesive material comprises a first portion having essentially U- or V-shaped cross section and thereby delimiting an elongated open tub, and a second portion resiliently movably connected to and extending along one edge of said first portion and thereby essentially closing said elongated tub when said second portion is in its rest position.

4. A prefabricated pane or windshield according to claim 3 in which said resiliently movable second portion has essentially triangular cross section, the apex of said triangle projecting over the top surface of said elongated tub and the base of said triangle opposite to the apex essentially closes said U- or V-shaped elongated tub.

5. A prefabricated pane or windshield according to claim 4 in which said resiliently movable second portion comprises a protrusion extending along the free base edge in the base plane of said triangle.

6. A prefabricated pane or windshield according to claim 4 in which said elongated tub comprises a first side wall and a second side wall, said second side wall being provided with said resiliently movable second portion and said first side wall being higher than said second side wall.

7. A prefabricated pane or windshield according to claim 6 in which the height of said first side wall essentially corresponds to the height of said elastically movable second portion.

8. A prefabricated pane or windshield according to claim 6 in which said first side wall comprises a rib member projecting towards said second side wall and extending along the inner surface of said first side wall in a height location essentially equal to the height location of the base of the cross sectional triangle of said resiliently movable second portion.

9. A prefabricated pane or windshield according to claim 4 in which said resiliently movable second portion comprises a plurality of recesses provided in the free edge at the apex of said triangle.

10. A prefabricated pane or windshield according to claim 9 in which said recesses are slots extending parallel to the base of said cross sectional triangle.

11. A prefabricated pane or windshield according to claim 2 in which said first profiled bead of adhesive material comprises a first portion having essentially U-shaped cross section and thereby delimiting an elongated open tub having a first and a second side wall, a second portion elastically movably connected to and extending along the upper free edge of said first side wall, and a third portion elastically movably connected to and extending along the upper free edge of said second side wall, said second and third portions of said first profiled bead of adhesive material essentially closing said elongated tub when said second and third portions are in their rest positions.

12. A prefabricated pane or windshield according to claim 11 in which said resiliently movable second and third portions of said first profiled bead of adhesive material each comprise a first leg, the first legs of said second and third portions together essentially closing said elongated tub, and a second leg projecting over the top surface of said elongated tub when said first and second legs are in their rest positions.

13. A prefabricated pane or windshield according to claim 12 in which said first legs of said second and third portions each are resiliently movably connected to the upper free edges of said first and second walls of said elongated tub.

14. A prefabricated pane or windshield according to claim 12 or 13 in which said second legs of said second and third portions each are resiliently movably connected to the free edges of said first legs.

15. A prefabricated pane or windshield according to claim 12 or 13 in which said second legs of said second and third portions each are resiliently movably connected to the upper free edges of said first and second walls of said elongated tub.

16. A prefabricated pane or windshield according to claim 13 in which said two second legs of said second and third portions are connected to each other by means of a foil such that said elongate tub containing said second bead of adhesive material is fully sealed.

17. A prefabricated pane or windshield according to claim 16 in which said foil is stickingly fixed to said two first legs such that it is teared off upon an elastic deformation of said two first legs.

18. A prefabricated pane or windshield according to claim 16 in which said foil consists of a material chemically compatible with the material of said second bead of adhesive material contained in said elongated tub.

19. A prefabricated pane or windshield according to claim 1 in which said first profiled bead of adhesive material delimits a hollow chamber open at one side, said hollow chamber containing said second bead of adhesive material, in which a cover member is provided which covers the free surface of said second bead of adhesive material, and in which said frame, flange or the like comprises means which penetrate into said hollow chamber upon mounting the pane or windshield in said frame, flange or the like thereby squeezing said second bead of adhesive material at least partially out of said hollow chamber.

20. A prefabricated pane or windshield according to claim 19 in which said hollow chamber delimited by said first profiled bead of adhesive material is only partly filled with said second bead of adhesive material.

21. A prefabricated pane or windshield according to claim 19 or 20 in which said cover member is located directly on the free surface of said second bead of adhesive material.

22. A prefabricated pane or windshield according to claim 19 in which said cover member is a flexible foil.

23. A prefabricated pane or windshield according to claim 22 in which said flexible foil rests on the entire free surface of said second bead of adhesive material.

24. A prefabricated pane or windshield according to claim 22 in which said flexible foil consists of a material which is chemically compatible with said second bead of adhesive material contained in said hollow chamber.

25. A prefabricated pane or windshield according to claim 19 in which said cover member is a rigid sheet-like body.

26. A prefabricated pane or windshield according to claim 25 in which said rigid sheet-like body is narrower than the width of said hollow chamber and rests on a central portion of the free surface of said second bead of adhesive material.

27. A prefabricated pane or windshield according to claim 26 in which the side walls of said hollow chamber are provided with ribs connected to and extending along the upper free edges of the side walls and projecting towards each other, the free edges of said ribs overlapping the edges of said rigid sheet-like body.

28. A prefabricated pane or windshield according to claim 1 in which said first profiled bead of adhesive material delimits a hollow chamber open at one side, said hollow chamber containing said second bead of adhesive material, in which a cover member is provided which covers the free surface of said second bead of adhesive material, and in which said frame, flange or the like comprises a portion protruding towards said hollow chamber delimited by said first profiled bead of adhesive material which penetrates into said hollow chamber upon mounting the pane or windshield in said frame, flange or the like thereby pressing said cover member into said second bead of adhesive material.

29. A prefabricated pane or windshield according to claim 28 in which said cover member is a flexible foil which is deformed when said protruding portion of said frame, flange or the like penetrates into said hollow chamber.

30. A prefabricated pane or windshield according to claim 28 in which said cover member is a rigid sheet-like body which is displaced essentially fully down to the bottom of said hollow chamber when said protruding portion of said frame, flange or the like penetrates into said hollow chamber.

31. A prefabricated pane or windshield according to claim 28 in which the height of said protruding portion of said frame, flange or the like is at least equal to or greater than the thickness of said second bead of adhesive material contained in said hollow chamber.

32. A prefabricated pane or windshield according to claim 29 in which said protruding portion in said frame, flange or the like has U-shaped cross section with a width somewhat less than the width of said hollow chamber.

33. A prefabricated pane or windshield according to claim 30 in which said protruding portion of said frame, flange or the like has U-shaped cross section with a width substantially less than the width of said hollow chamber.

34. A prefabricated pane or windshield according to claim 1 in which said first profiled bead of adhesive material comprises at least one expulsion member squeezing said second bead of adhesive material contained in said hollow chamber at least partially out of said hollow chamber.

35. A prefabricated pane or windshield according to claim 34 in which said hollow chamber delimited by said first profiled bead of adhesive material is covered by an elastically deformable cover leg integrally formed on the upper free edge of one of the side walls of said hollow chamber.

36. A prefabricated pane or windshield according to claim 35 in which the other side wall of said hollow chamber is higher than said one of the side walls provided with said cover leg and comprises a rib projecting towards said one of the side walls provided with said cover leg.

37. A prefabricated pane or windshield according to claim 34 in which said expulsion member is constituted by an element having a variable volume and located in the interior of said hollow chamber.

38. A prefabricated pane or windshield according to claim 37 in which said element is a flexible tube which is flat in its rest position before the pane or windshield is inserted into the frame, flange or the like.

39. A prefabricated pane or windshield according to claim 38 in which said flat flexible tube is located at the bottom of said hollow chamber below said second bead of adhesive material.

40. A prefabricated pane or windshield according to claim 37 in which a tear-off wire or string is provided in the interior of said variable volume element.

41. A prefabricated pane or windshield according to claim 34 in which said hollow chamber delimited by said first profiled bead of adhesive material is covered by a plastically deformable foil.

42. A prefabricated pane or windshield according to claim 41 in which said plastically deformable foil is provided with an expulsion member located at the outer side of said foil and projecting over the height of at least one of the side walls of said hollow chamber.

43. A prefabricated pane or windshield according to claim 42 in which said expulsion member has circular cross section with a diameter less than the inner width of said hollow chamber filled with said second bead of adhesive material.

44. A prefabricated pane or windshield according to claim 34 in which said hollow chamber delimited by said first profiled bead of adhesive material is closed by an expulsion member resting on the top surface of said second bead of adhesive material contained in said hollow chamber.

45. A prefabricated pane or windshield according to claim 44 in which said expulsion member has essentially triangular cross section and projecting over the height of at least one of the side walls of said hollow chamber.

46. A prefabricated pane or windshield according to claim 44 in which said expulsion member rests, with reference to the width, only on a central portion of the top surface of said second bead of adhesive material contained in said hollow chamber.

47. A prefabricated pane or windshield according to claim 46 in which the upper free edges of the side walls delimiting said hollow chamber are provided with ribs projecting towards each other and overlapping the lateral edges of said expulsion member.

48. A prefabricated pane or windshield according to claim 46 in which the side walls delimiting said hollow chamber are provided with supporting ribs projecting towards each other and located below the upper free edges of said side walls, thereby supporting said expulsion member.

49. A prefabricated pane or windshield according to claim 1 in which said first profiled bead of adhesive material consists of polyurethane material.

50. A prefabricated pane or windshield according to claim 1 in which said second bead of adhesive material consists of polyurethane material.

51. A prefabricated pane or windshield according to claim 1 in which said second bead of adhesive material includes a substance curing under the influence of oxygen.

52. A prefabricated pane or windshield according to claim 1 in which said second bead of adhesive material includes a substance curing under the influence of moisture.

53. A prefabricated pane or windshield according to claim 1 in which said second bead of adhesive material includes a substance activatable by heat.

54. A prefabricated pane or windshield according to claim 53 in which said heat activatable substance irreversibly cures under the influence of heat.

55. A prefabricated pane or windshield according to claim 1 in which said second bead of adhesive material includes a slowly curing two component substance.

56. A prefabricated pane or windshield according to claim 1 constituting a ready-to-use component to be mounted in a car body by gluing without the need to use an additional mounting adhesive.

57. A prefabricated pane or windshield according to claim 15 in which said two second legs of said second and third portions are connected to each other by means of a foil such that said elongate tub containing said second bead of adhesive material is fully sealed.

* * * * *